US012646519B1

(12) United States Patent
Van Huizen

(10) Patent No.: US 12,646,519 B1
(45) Date of Patent: Jun. 2, 2026

(54) VOICE-ACTIVATED SYSTEMS AND METHODS FOR ENGAGING VEHICLE CONTROLS

(71) Applicant: Michael Van Huizen, Marblemount, WA (US)

(72) Inventor: Michael Van Huizen, Marblemount, WA (US)

( * ) Notice: Subject to any disclaimer, the term of this patent is extended or adjusted under 35 U.S.C. 154(b) by 10 days.

(21) Appl. No.: 19/052,097

(22) Filed: Feb. 12, 2025

(51) Int. Cl.
| | |
|---|---|
| *G10L 15/22* | (2006.01) |
| *B60R 16/02* | (2006.01) |
| *B60R 16/023* | (2006.01) |

(52) U.S. Cl.
CPC .......... *G10L 15/22* (2013.01); *B60R 16/0231* (2013.01); *G10L 2015/223* (2013.01)

(58) Field of Classification Search
CPC ........................ G10L 15/22; G10L 2015/223; B60R 16/0231
USPC ........................................................... 701/36
See application file for complete search history.

(56) References Cited

U.S. PATENT DOCUMENTS

| | | | |
|---|---|---|---|
| 10,144,346 B1 | 12/2018 | Dohan | |
| 11,524,688 B2 | 12/2022 | Kato et al. | |
| 2002/0150267 A1* | 10/2002 | Furuta ................... | E02F 9/2025 381/110 |
| 2006/0082221 A1 | 4/2006 | Mouzas | |
| 2016/0086395 A1* | 3/2016 | Yamashiro ............. | B60K 35/22 701/36 |

| | | | |
|---|---|---|---|
| 2017/0169823 A1 | 6/2017 | Neff | |
| 2018/0053414 A1* | 2/2018 | Qin ........................ | B60W 50/14 |
| 2019/0299849 A1* | 10/2019 | Dohan ................. | B60Q 1/2657 |
| 2022/0185111 A1 | 6/2022 | Biswal et al. | |
| 2023/0339557 A1* | 10/2023 | Tambo ................. | B62D 15/025 |

OTHER PUBLICATIONS

Pooja B. Gajghane, Neha R. Jethawa, Jayesh K. Kokate, Voice Recognization System to Control Car Interior, Apr. 30, 2018.
K. Amri Tofrowaih, A. F. Ali, M. F. Mukhtar, Development of low-cost voice operated vehicle turn signal system for eco-car urban concept using arduino uno, Dec. 31, 2020.
Wachid Yahya, Canggih Ajika Pamungkas, Design of Voice Control System an Android and Arduino-Assisted as a Component Activation on Vehicles, Jul. 31, 2019.

* cited by examiner

*Primary Examiner* — Kira Nguyen
(74) *Attorney, Agent, or Firm* — Michael R. Schacht; Bronte Brillantes; Schacht Law Office, Inc.

(57) ABSTRACT

A voice-activated system for a vehicle having a vehicle control and a vehicle structure. The voice-activated system comprises a control system and lever assembly. The control system comprises a controller configured to receive at least one voice command and deliver a signal and a drive system configured to receive the signal from the controller. The lever assembly comprises at least one arm portion and defines a lever cavity. The lever assembly is connected to the control system and defines a neutral position, and at least one activated position. The lever assembly is connected to the drive system so when the drive system receives the signal, the lever assembly is moved between the neutral position and the activated position. The lever assembly is arranged so the vehicle control extends through the lever cavity and the arm portion is configured to engage the vehicle control in the activated position.

17 Claims, 5 Drawing Sheets

VOICE-ACTIVATED SYSTEMS AND METHODS FOR ENGAGING VEHICLE CONTROLS

TECHNICAL FIELD

The present invention relates to voice-activated systems and methods for engaging vehicle controls when supported on a vehicle structure.

BACKGROUND

Assistive technology, such as voice-activated systems, can be beneficial for drivers who have limited physical ability to access or manipulate certain vehicle controls, such as a turn signal.

Assistive technology often requires installment after the vehicle is constructed or purchased. In order to add assistive technology to a vehicle, complete integration to the vehicle electronics is required which can be a complicated or expensive process.

The need thus exists for a voice-activated system and method that is easy to install on a vehicle structure without completely integrating the device with the vehicle electronics.

SUMMARY

The present invention may be embodied as a voice-activated system for a vehicle having at least one vehicle control and at least one vehicle structure. The voice-activated system comprises a control system and a lever assembly. The control system comprises a controller configured to receive at least one voice command and deliver a signal defined by the at least one voice command; and a drive system configured to receive the signal from the controller. The lever assembly is comprised of at least one arm portion and defines a lever cavity.

The lever assembly is connected to the control system and configured to define a neutral position, and at least one activated position. The lever assembly is connected to the drive system such that when the drive system receives the signal, the drive system actuates the lever assembly between the neutral position and the at least one activated position. The at least one lever assembly is arranged so the vehicle control extends through the lever cavity and the at least one arm portion is configured to engage the at least one vehicle control when the lever assembly is in the at least one activated position.

The present invention may also be embodied as a voice-activated system for a vehicle having at least one vehicle control and at least one interior structure. The voice-activated system comprises a control system and a lever assembly. The control system comprises a controller configured to receive at least one voice command and deliver a signal defined by the at least one voice command, and a drive system configured to receive the signal from the controller. The lever assembly comprises a first arm portion, a second arm portion and defining a lever cavity. The lever assembly is connected to the control system and configured to define a neutral position a first activated position, and a second activated position. The lever assembly is connected to the drive system such that when the drive system receives the signal, the drive system actuates the lever assembly between the neutral position, the first activated position, and the second activated position according to the at least one voice command. The at least one lever assembly is arranged so the vehicle control extends through the lever cavity and the first arm portion and the second arm portion are configured to engage the at least one vehicle control when the lever assembly is in the first activated position and the second activated position.

The present invention may also be embodied as a method for engaging a vehicle control of a vehicle having a vehicle structure using a voice-activated system. A control system is provided, the control system comprising a controller configured to receive at least one voice command and deliver a signal defined by the at least once voice command, and a drive system configured to receive the signal from the processor. A lever assembly is provided comprising at least one arm portion and defining a lever cavity. The lever assembly is connected to the control system to define a neutral position, and at least one activated position. The lever assembly is connected to the drive system such that when the drive system receives the signal, the drive system actuates the lever between the neutral position and the at least one activated position according to the voice command. The lever assembly is arranged so the vehicle control extends through the lever cavity and configuring the at least one arm portion to engage the vehicle control when the lever assembly is in the at least one activated position.

DETAILED DESCRIPTION

Figure 1:
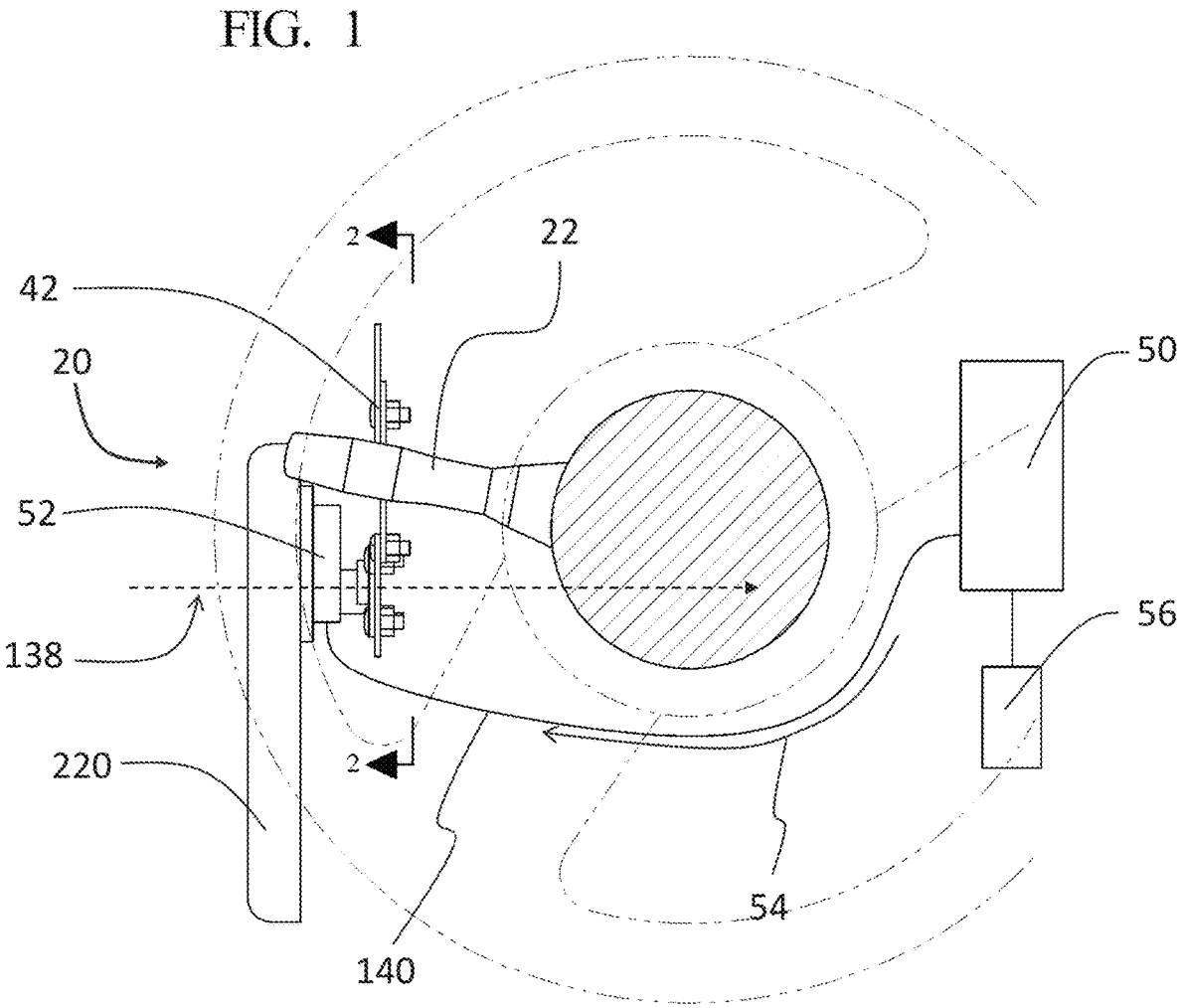
FIG. 1 is a front elevational view of the first example voice-activated system of the present invention supported on a vehicle structure.

Referring initially to FIG. 1 of the drawing, depicted therein is a first example the voice-activated system 20 constructed in accordance with, and embodying, the principles of the present invention. FIG. 1 illustrates that the example voice-activated system may be used to engage with a vehicle control 22 of a vehicle (not shown) and supported by a vehicle structure 24. The first example voice-activated system 20 can be used on a vehicle control 22 that is a turn signal. Other vehicle controls may include windshield wipers, lights, or a gear shift. The example voice-activated system 20 is configured to be supported by a vehicle structure 24 such as a dashboard, HVAC system, or center console. The example vehicle, vehicle control 22, and vehicle structure 24, are or may be conventional and will not be described herein beyond the extent helpful for a complete understanding of the construction and operation of the first example voice-activated system 20.

As shown in FIG. 1, the first example voice-activated system 20 comprises a control system 40 and a lever assembly 42. The example control system 40 is comprised of a controller 50 and a drive system 52. The controller 50 is configured to receive at least one voice command (not shown) and send a signal 54, defined by the voice command, to the drive system 52. The example control system 40 is further powered by a power supply 56 which can be a USB port or other equivalent power source.

The lever assembly 42 is comprised of at least one arm portion 70 and defines a lever cavity 72. The lever assembly 42 is connected to the control system 40 and configured to define a neutral position 80 and at least one activated position 82. The lever assembly 42 is configured to be positioned on the vehicle structure 24 so the at least one arm portion 70 can engage the vehicle control 22. The lever assembly 42 is rotatably connected to the drive system 52 such that when the drive system 52 receives the signal 54, the drive system 52 actuates the lever assembly 42 between the neutral position 80 and the activated position 82. When the lever assembly 42 is in the activated position, the arm portion 70 is configured to engage the vehicle control 22.

Given the foregoing general understanding of the construction and operation of the first example voice-activated system 20, the details of construction and operation of the first example voice-activated system 20 will now be described.

The example controller 50 is or may be a conventional microcontroller and will only be described to the extent helpful for a complete understanding of the construction and operation of the control system 40. The example controller 50 may comprise an input processing unit 120 and a processor 122. The input processing unit 120 is configured to capture voice commands and convert the voice command into text that is readable by the processor 122. The processor 122 is programed to identify the voice command and deliver the signal 54 corresponding to the voice command. The signal 54 is then transmitted to the drive system 52. The example controller 50 is configured to process a variety of voice commands including directional commands such as: left, right, up, or down.

The example drive system 52 is comprised of a drive system housing 130, a drive shaft 132, and a drive mount 134. The example drive system 52 is or may be a conventional servomechanism and will only be described herein to the extent helpful for a complete understanding of the construction and operation of the first example voice-activated system 20. The example drive system 52 may contain a motor, a feedback mechanism, and a control circuit contained within the drive system housing 130. The example drive shaft 132 is or may be connected to the motor, and the motor drives the movement of the drive shaft 132. The example drive mount 134 is connected to the drive shaft 132. The drive shaft 132 defines a shaft outer surface 140 that is ridged, grooved, threaded, or otherwise configured to support the lever assembly 42. The example drive mount 134 defines a mount opening 142 that is sized and dimensioned to receive the shaft outer surface 140 of the drive shaft 132. Operation of the drive system 52 causes the drive mount 134 to be displaced relative to the drive system housing 130.

Figure 2:
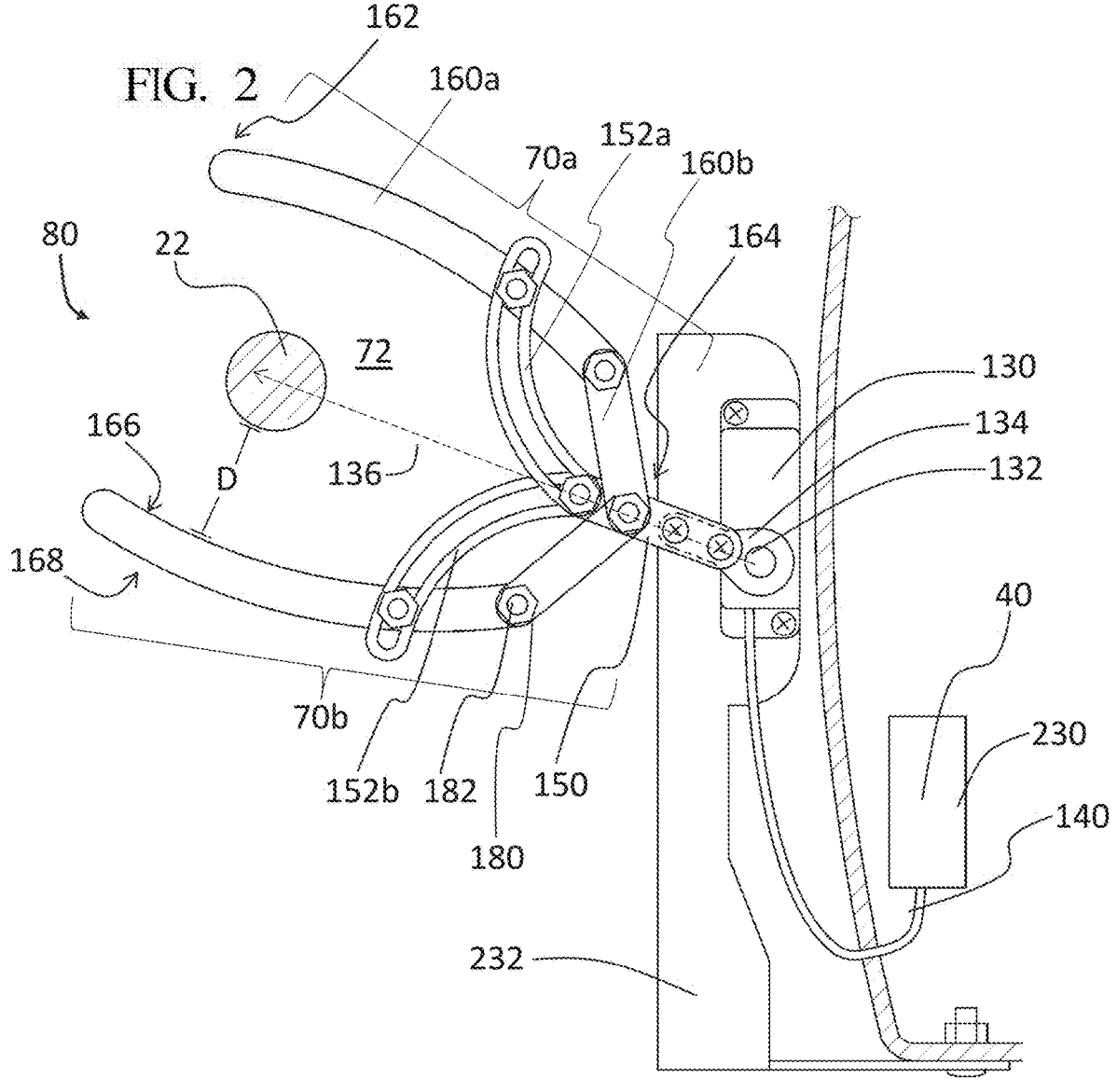
FIG. 2 is a side elevational view of the voice-activated system in a neutral position.

The example drive system 52 further defines an alignment axis 136 and pivot axis 138. The example alignment axis 136 is aligned or substantially aligned along the drive mount 134, as depicted in FIG. 2. The example pivot axis 138 extends outwardly from the drive shaft 132, as depicted in FIG. 1. The example alignment axis 136 is configured to rotate about the pivot axis 138.

The example control system 40 further comprises wires 144 that are configured to connect the controller 50, drive system 52, and carry power from the power supply 56 to the controller 50. The wires 144 connecting the controller 50 to the drive system 52 are configured to carry signals.

The example lever assembly 42 is comprised of the at least one arm portion 70, the lever cavity 72, an anchor member 150, and a guide member 152.

The example arm portion 70 of the lever assembly 42 is comprised of at least one arm member 160 and defines a first end 162, a second end 164, an inner edge 166, and an outer edge 168. The first end 162 of the arm portion 70 is connected to the anchor member 150 and the second end 164 extends outward aligned with the alignment axis 136 of the drive mount 134. The inner edge 166 of the example arm portion 70 is defined by the edge of the arm portion 70 that contacts the vehicle control 22.

The example arm portion 70 is comprised of a first arm member 160*a* and a second arm member 160*b*. The example arm portion 70 is constructed with material strong enough maintain its structure when engaging with the vehicle control 22. The letter appendices (e.g., 160*a*, 160*b*) indicate specific instances of the component labeled with that reference character and are not intended to represent distinct components.

The example lever assembly 42 is comprised of a first portion 70*a* and a second arm portion 70*b*. The example first 70*a* and second 70*b* arm portions 70*a* and 70*b* define the lever cavity 72. The example lever cavity 72 is defined by the space between the inner surface 166 of the arm portions 70*a* and 70*b*.

The example anchor member 150 is mounted to the drive mount 134 of the drive system 52. The example anchor member 150 is configured to secure the arm portions 70*a* and 70*b* to the drive system 52.

Figure 3:
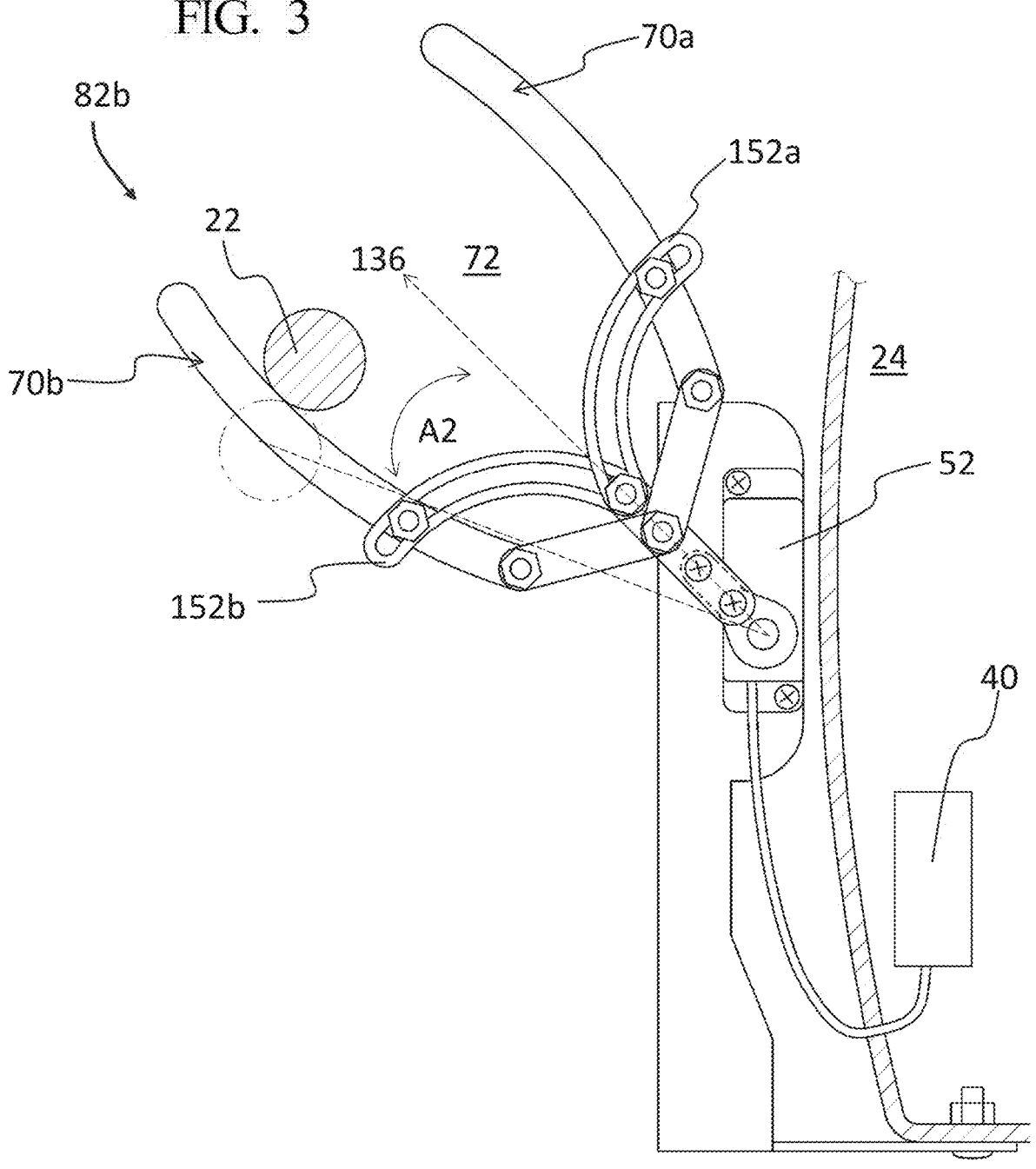
FIG. 3 is a side elevational view of the voice-activated system in a first activated position.
Figure 4:
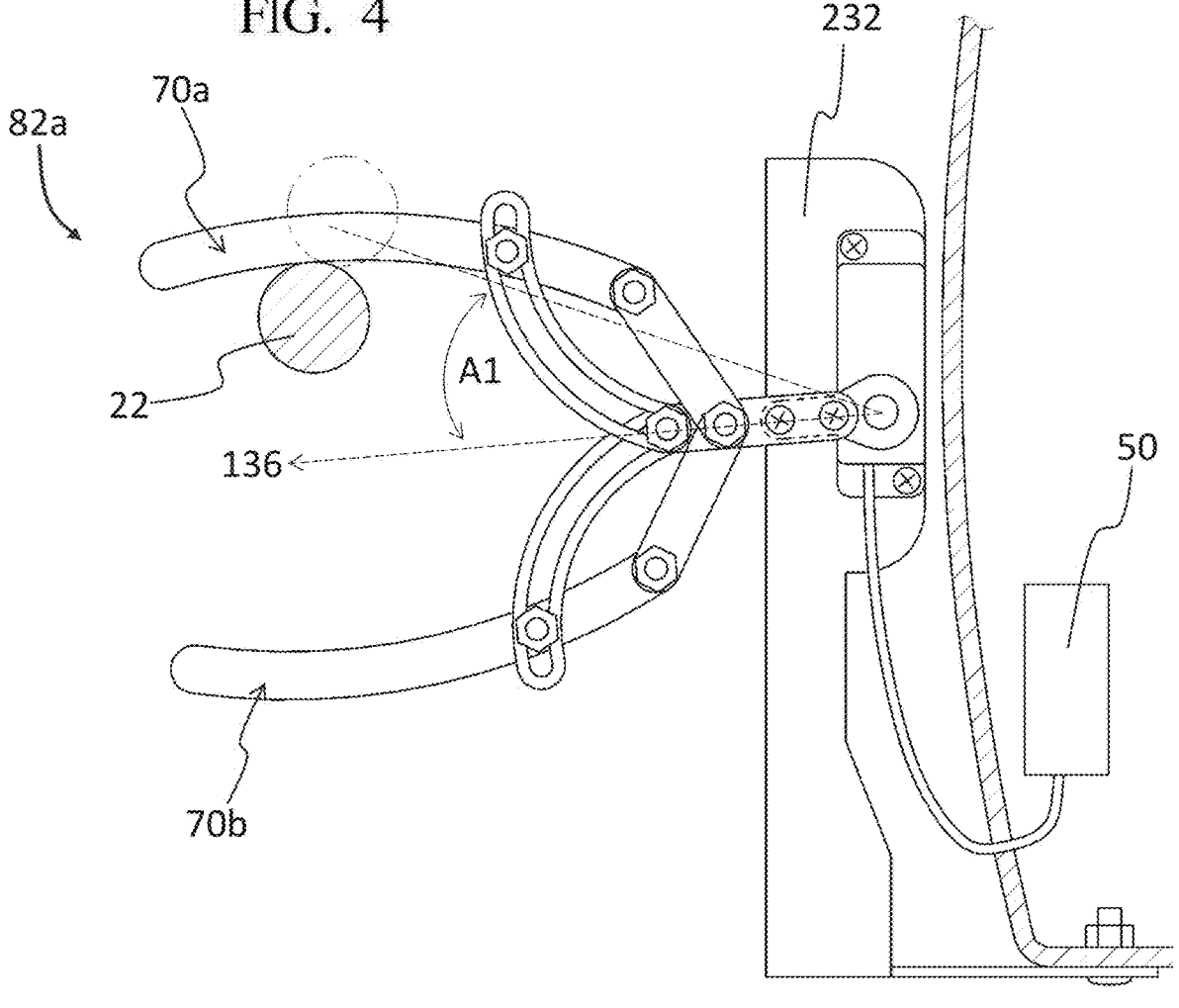
FIG. 4 is a side elevational view of the voice-activated system in a second activated position.
Figure 5:
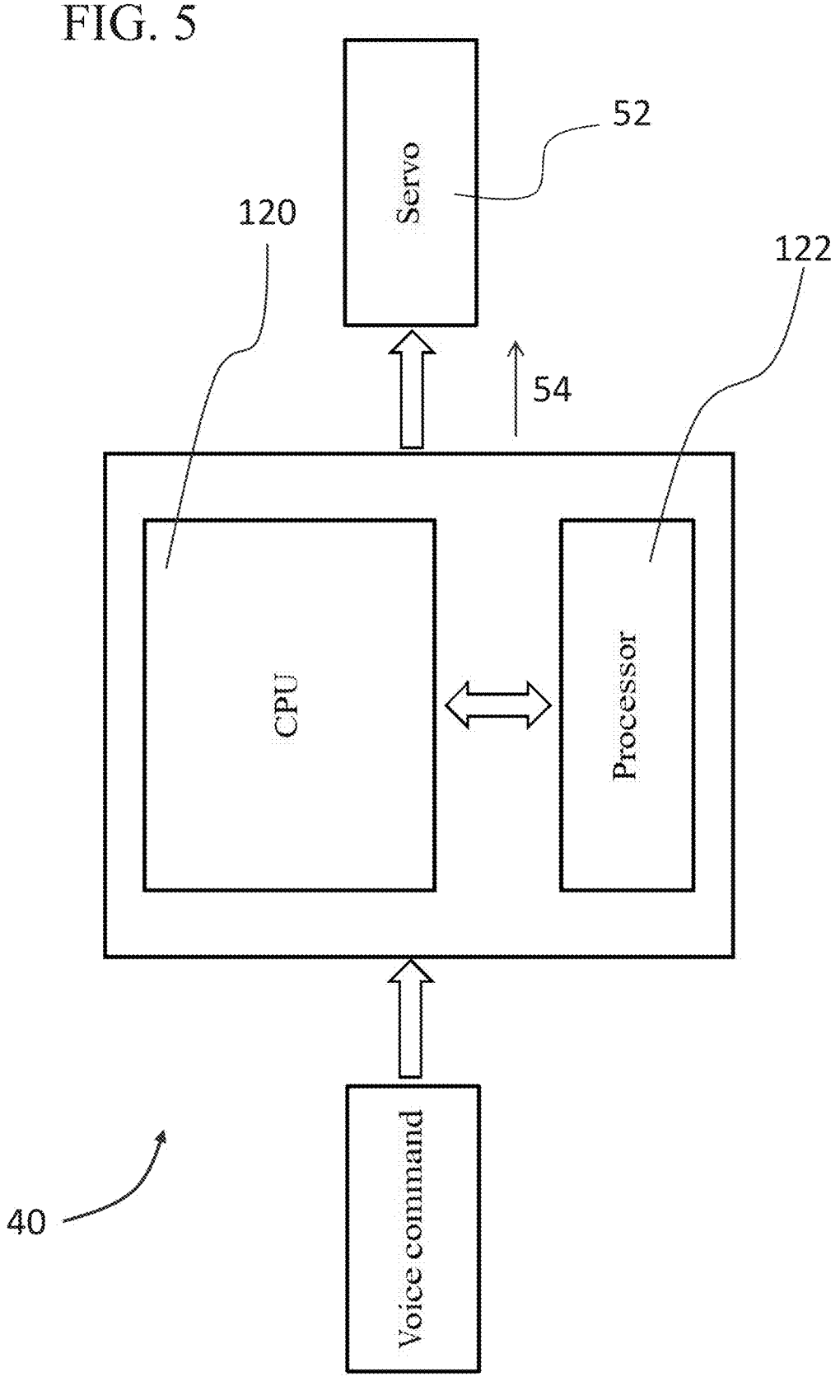
FIG. 5 is a block diagram of the controller of the voice-activated system.

The example lever assembly 42 further comprises a first guide member 152*a* and a second guide member 152*b*. The example guide members 152*a* and 152*b* are connected to the anchor member 150 and arm portions 70*a* and 70*b*, as depicted in FIGS. 2-4. The example guide members 152*a* and 152*b* are similar or the same and each define a guide member slot 170. The example guide member slot 170 provides a channel for fasteners 182. The example guide members 152*a* and 152*b* are configured to position the arm portions 70*a* and 70*b* relative to the vehicle control 22. The position of the fasteners 182 can be adjusted within the guide member slot 170 to move the arm portions 70*a* and 70*b* to a desired position based on the configuration of the vehicle control 22 in the vehicle 26. The guide members 152*a* and 152*b* are further configured to secure the first and second arm members 160*a* and 160*b* so the arm members 160*a* and 160*b* maintain their structure when engaging the vehicle control 22.

The example arm portions 70*a* and 70*b*, anchor member 150, and guide members 152*a* and 152*b* further define openings 180 that are configured to receive fasteners 182. The example fasteners 182 can be conventional screws, nuts, bolts or equivalent. The openings 180 and fasteners 182 are configured to connect each part of the lever assembly 42. Alternatively, the lever assembly 42 can be constructed into at least one or more integrated members.

During initial configuration, the example lever assembly 42 is arranged relative to the vehicle control 22. The example arm portions 70*a* and 70*b* are connected to the anchor member 150 and define a distance D between the inner edge 166 of the arm portion 70 and the vehicle control 22. The example arm members 160*a* and 160*b* can be adjusted and secured to the anchor member 150 and guide members 152*a* and 152*b*. The arm portions 70*a* and 70*b* are fastened to the guide members 152*a* and 152*b* and can be adjusted by moving the fasteners 182 to a desired position in the guide member slot 170. The example arm portions 70*a* and 70*b* are sized and dimensioned so that, when connected to the anchor member 150, the arm portions 70*a* and 70*b* extend beyond the vehicle control 22. The lever assembly 42 is further arranged on the vehicle structure 24 so that at least a portion of the vehicle control 22 extends through the lever cavity 72. The arrangement of the arm portions 70a and 70b, the arm members 160a and 162b, the guide members 152a and 152b can be adjusted according to the vehicle 26 and vehicle control 22.

The voice activated system 20 can further comprise a mounting assembly 220. The mounting assembly 220 comprises a controller mount (not shown) and a lever mount 232. The controller mount is configured to support at least a portion of the control system 40. The lever mount 232 is configured to support the lever assembly 42 and arrange the lever assembly 42 so the arm portions 70a and 70b extend beyond the vehicle control 22, as depicted in FIG. 2-4. The mounting assembly 22 can be securely fixed to the vehicle structure 220 using screws, or bolts. Alternatively, the mounting system 220 can be temporarily fixed to the vehicle structure 20 using detachable mounts using magnetic, Velcro or affixed to the HVAC system in a vehicle.

FIGS. 2-4 illustrate an example method of using the first example voice activated system 20. Initially, as shown in FIG. 2, the controller 50 is connected to the drive system 52 through the wire 126. The controller 50 and drive system 52 are connected to the vehicle structure 24. The lever mount 232 is securely fixed to the vehicle structure and configured to support the drive system 52 and lever assembly 42.

The lever assembly 42 is securely fixed to the drive system 52. The anchor member 150 of the lever assembly 42 is fastened to the drive mount 134 of the drive system 52 using fasteners 182. The lever mount 232 is configured to support the lever assembly 42 and arranged so that the arm portions 70a and 70b extend beyond the vehicle control 22 and the vehicle control 22 extends at least partially through the lever cavity 72. The neutral position 80 of the lever assembly 42 is defined when neither arm portion 70a and 70b are in contact with the vehicle control 22, as depicted in FIG. 2. In the neutral position, the drive system 52 arranges the drive mount 134 so the arm portions 70a and 70b maintain a distance D from the vehicle control 22.

When a voice command is given, the voice command is processed by the controller 50 and assigned to the corresponding signal 54. The controller 54 sends the signal 54 to the drive system 52. The signal 54 is processed by the drive system 52 and controls the movement of the drive mount 134 according to the signal 54. The movement of the drive mount 134 causes the displacement of the lever assembly 42. The lever assembly 42 rotates about the pivot axis 138 while maintaining alignment with the alignment axis 136. The example drive system 52 is programmed to direct the movement of the lever assembly 42 between the neutral position 80 and activated position 82.

The drive system 52 defines a maximum angle A1 and A2 that the drive mount 134 may rotate when given a signal 54. The angles A1 and A2 correspond to the rotation of the first activated position 82a and second activated position A2. The distance D is defined by the space between each arm portion 70a and 70b and the vehicle control 22. When the drive mount 132 rotates the angle A1 or A2 into the activated position 82a or 82b, the arm portion 70a or 70b will engage the vehicle control.

The example voice-activated system 20 comprises a first activated position 82a and a second activated position 82b. Referring to FIG. 4, the example first activated position 80a is depicted. The first activated position 80a is defined by the engagement of the first arm portion 70a with the vehicle control 22. In the example first activated position 80a, the lever assembly 42 is actuated and moves an angle A1 in order to contact the vehicle control 22 and cause the vehicle control 22 to move and activate. As an example, when the vehicle control is a turn signal, the first activated position 82a causes the turn signal to move downward and activate the right turn signal.

Referring to FIG. 3, the example second activated position 80b is depicted. The second activated position 80b is defined by the engagement of the second arm portion 70b with the vehicle control 22. In the example second activated position 80b, the lever assembly 42 is actuated and moves an angle A2 in order to contact the vehicle control 22 and cause the vehicle control 22 to move and activate. As an example, when the vehicle control is a turn signal, the second activated position causes the turn signal to move upward and activate the right turn signal.

During normal operation, the voice-activated system 20 causes the lever assembly 42 to actuate between the neutral position and activated positions 82a and 82b. When the lever assembly 42 is given the voice command to enter into either activated position 82a or 82b, the lever assembly engages the vehicle control 22 to activate the vehicle control 22. After entering into the activated position the lever assembly 42 returns to the neutral position 80. The voice-activated system 20 is configured to allow normal operation of the vehicle control.

As an example, when the vehicle control is a turn signal, the lever assembly enters the activated position to activate the turn signal and then returns to the neutral position. This allows the vehicle to turn and enable the turn signal to be automatically turned off through normal operation of the turn signal. Alternatively, the control system 40 can be programmed with voice commands that require a user to give a voice command that would actuate the lever assembly so it returns to a neutral position.

What is claimed is:

1. A voice-activated system for a vehicle having a vehicle control and a vehicle structure, the voice-activated system comprising:
    a control system comprising
        a controller configured to receive at least one voice command and deliver a signal defined by the at least one voice command; and
        a drive system configured to receive the signal from the controller;
    a lever assembly is comprised of at least one arm portion and defines a lever cavity; wherein
    the lever assembly is connected to the control system and configured to define
        a neutral position, and
        at least one activated position;
    the lever assembly is connected to the drive system such that when the drive system receives the signal, the lever assembly moves between the neutral position and the at least one activated position; and
    the lever assembly is arranged so the vehicle control extends through the lever cavity and the at least one arm portion is configured to engage the at least one vehicle control when the lever assembly is in the at least one activated position.

2. The voice-activated system of claim 1, in which
    the lever assembly comprises a first arm portion and a second arm portion and defines a first activated position and a second activated position; wherein when the lever assembly is in the first activated position,
the at least one vehicle control is engaged by at least
one of the first arm portion, or
the second arm portion; and
when the lever assembly is in the second activated posi-
tion, the at least
one vehicle control is engaged by at least one of
the first arm portion, or
the second arm portion.

3. The voice-activated system of claim 1, in which the
signal defines the at least one activated position.

4. The voice-activated system of claim 1, in which the
controller is further comprised of a processor.

5. The voice-activated system of claim 4, in which the
processor further comprises a program configured to process
the at least one voice command and convert the voice
command into the signal.

6. The voice-activated system of claim 1, further com-
prising a mounting assembly configured to support the lever
assembly and the control system on the vehicle structure.

7. A voice-activated system for a vehicle having a vehicle
control and an interior structure, the voice-activated system
comprising:
  a control system comprising
    a controller configured to receive at least one voice
      command and deliver a signal defined by the at least
      one voice command, and
    a drive system configured to receive the signal from the
      controller;
  a lever assembly comprising a first arm portion, a second
    arm portion and defining a lever cavity; wherein
  the lever assembly is connected to the control system and
    configured to define
    a neutral position
    a first activated position, and
    a second activated position;
  the lever assembly is rotatably connected to the drive
    system such that when the drive system receives the
    signal, the lever assembly is moved between the neutral
    position, the first activated position, and the second
    activated position according to the at least one voice
    command; and
  the lever assembly is arranged so the vehicle control
    extends through the lever cavity and the first arm
    portion and the second arm portion are configured to
    engage the at least one vehicle control when the lever
    assembly is in the first activated position and the
    second activated position.

8. The voice-activated system of claim 7, in which the
signal defines the first and second activated position.

9. The voice-activated system of claim 7, in which the
controller is further comprised of a processor.

10. The voice-activated system of claim 9, in which the
processor further comprises a program configured to process
the at least one voice command and convert the voice
command into the signal.

11. The voice-activated system of claim 7, further com-
prising a mounting assembly configured to support the lever
assembly and the control system.

12. A method for engaging a vehicle control of a vehicle
having a vehicle structure using a voice-activated system,
the method comprising the steps of:
  providing a control system, the control system comprising
    a controller configured to receive at least one voice
      command and deliver a signal defined by the at least
      once voice command, and
    a drive system configured to receive the signal from the
      processor;
  providing a lever assembly comprising at least one arm
    portion and defining a lever cavity;
  connecting the lever assembly to the control system to
    define a neutral position, and
    at least one activated position; wherein
  connecting the lever assembly to the drive system such
    that when the drive system receives the signal, the lever
    assembly is moved between the neutral position and the
    at least one activated position according to the voice
    command; and
  arranging the lever assembly so the vehicle control
    extends through the lever cavity and configuring the at
    least one arm portion to engage the vehicle control
    when the lever assembly is in the at least one activated
    position.

13. The method of claim 12, in which the providing a
lever assembly step further comprises
  providing a first arm portion and a second arm portion;
  defining a first activated position and a second activated
    position;
  engaging the at least one vehicle control when the lever
    assembly is in the first activated position by at least one
    of
    the first arm portion, or
    the second arm portion; and
  engaging the at least one vehicle control when the lever
    assembly is in the second activated position by at least
    one of
    the first arm portion, or
    the second arm portion.

14. The method as recited in claim 12, in which the step
of providing a control system comprises the step of defining
the at least one activated position with the signal.

15. The method as recited in claim 12, in which the step
of providing the control system comprises providing a
processor.

16. The method as recited in claim 15, in which the step
of providing the processor further comprises providing a
program configured to process the at least one voice com-
mand and convert the voice command into the signal.

17. The method as recited in claim 12, further comprising
the step of providing a mounting assembly configured to
support the lever and the control system.

* * * * *